United States Patent [19]
Pelton

[11] 3,854,118
[45] Dec. 10, 1974

[54] SERVO HYDRAULIC VIBRATOR WITH PHASE ERROR CORRECTION

[75] Inventor: Charles R. Pelton, Ponca City, Okla.

[73] Assignee: The Pelton Company, Inc., Ponca City, Okla.

[22] Filed: Nov. 10, 1971

[21] Appl. No.: 197,254

[52] U.S. Cl. ............... 340/17, 181/.5 EC, 181/.5 H
[51] Int. Cl. ............................................. G01v 1/16
[58] Field of Search ........... 181/.5 H, .5 EC, .5 VM, 181/.5 AG; 73/71.5, 71.6; 340/15.5 R

[56] References Cited
UNITED STATES PATENTS

| | | | |
|---|---|---|---|
| 2,955,460 | 10/1960 | Stevens et al. | 181/.5 H |
| 3,208,550 | 9/1965 | Costaret et al. | 181/.5 H |
| 3,219,971 | 11/1965 | Cole | 340/15.5 R |
| 3,363,720 | 1/1968 | Mifsud et al. | 181/.5 H |
| 3,516,510 | 6/1970 | Coburn et al. | 181/.5 H |
| 3,578,102 | 5/1971 | Ross et al. | 181/.5 H |
| 3,698,508 | 10/1972 | Landrum, Jr. | 181/.5 EC |

FOREIGN PATENTS OR APPLICATIONS

| | | | |
|---|---|---|---|
| 1,033,705 | 6/1966 | Great Britain | 73/71.5 |

*Primary Examiner*—Maynard R. Wilbur
*Assistant Examiner*—T. M. Blum
*Attorney, Agent, or Firm*—Head & Johnson

[57] ABSTRACT

This invention is an improvement over conventional electrohydraulic vibrator systems in which the feedback control to the vibrator for phase control of its output, includes a signal which is the sum of the output of an accelerometer on the base plate and a mass displacement sensor, which measures the displacement between the mass and the base plate.

6 Claims, 3 Drawing Figures

SERVO HYDRAULIC VIBRATOR WITH PHASE ERROR CORRECTION

BACKGROUND OF THE INVENTION

In the geophysical industry in recent years there has come to be a very much increased use of a type of seismic system in which the conventional impulsive signal from a source, such as dynamite, is displaced by a long-time-duration signal of particular frequency characteristics. Such systems are known under the trade name of Vibroseis, and utilize as a signal input to the vibrator what is called a sweep signal or swept frequency signal. Such swept frequency signals may have a duration of up to 7 seconds, and may vary in frequency during the sweep from, for example, 20 to 100 Hz. This sweep signal is used to control the output of an electrohydraulic vibrator which impresses a facsimile signal into the earth as a seismic wave. This seismic wave is detected at a distance from the source after it has passed through the earth. The received signal is mathematically correlated with the sweep signal which was impressed on the vibrator, and the output of this correlation is the seismic signal which is used in the record analysis to provide information regarding the subsurface geology.

In order that the sweep signal which is used to control the vibrator may be used to correlate with the detected signal, it is important that the seismic signal impressed on the earth be identical in frequency, phase and amplitude to the sweep signal which drives the vibrator. To this end, it is important that a control means be provided between the vibrator base plate and the input to the vibrator control so as to maintain this similarity between the base plate motion and the input sweep signal.

It is customary, therefore, to provide a sensor, such as an accelerometer, mounted on the base plate of the vibrator to provide a signal which is fed back through an electronic network to ensure that there is proper phase control of the vibrator so that it will faithfully follow the input sweep signal.

However, there is one great difficulty with this type of feedback signal, and that is, that at low frequencies the amplitude of vibration of the base plate is very small and it is very difficult to get a clean, undistorted sine wave signal from the accelerometer to feed back through the control system to keep the vibrator in phase control with the input signal.

This invention is directed towards an improvement in the feedback control system so that a larger and more reliable feedback signal is provided at low frequencies so as to control the vibrator to provide the faithful output signal.

SUMMARY OF THE INVENTION

In the normal use of the electrohydraulic vibrator it is customary to provide a displacement feedback from the last stage of the hydraulic valves and from the mass of the vibrator, the latter signal being a measure of the displacement between the mass and the piston, which drives the base plate.

I have found that at low frequencies, that is, frequencies below resonances of the base plate-earth system, the mass displacement signal and the accelerometer signal are in-phase. Furthermore, as the frequency decreases from resonance, the accelerometer signal decreases in amplitude very rapidly, down to a value which is too small to provide by itself a suitable feedback control. Conversely, as the frequency decreases, the amplitude of vibration of the mass increases and therefore the displacement signal between the mass and the base-plate increases as the frequency decreases. As a result, at low frequencies the two signals are in-phase and the mass displacement signal is larger by a factor of ten or more than the accelerometer signal.

In this invention, therefore, I use the sum of the accelerometer signal and the mass displacement signal as a combined feedback signal to the phase control network.

It is therefore an objective of this invention to provide an improved type of phase control for maintaining the base plate motion in close similarity in frequency, phase and amplitude to that of the input sweep signal. This and other objectives and an understanding of the principles of this invention will be evident from the following description taken in conjunction with the appended drawings, in which:

DESCRIPTION OF THE PREFERRED EMBODIMENT

Figure 1:
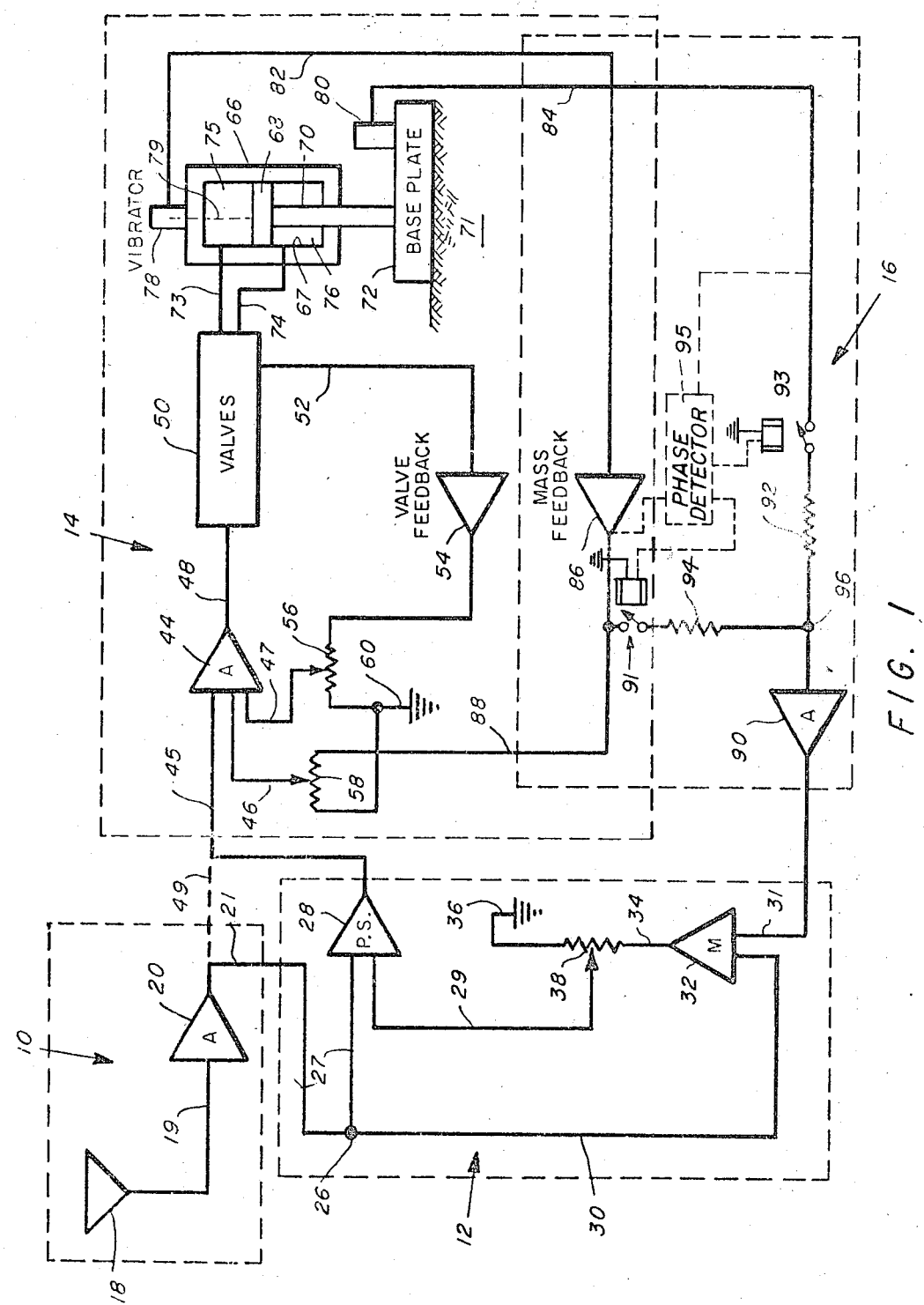
FIG. 1 represents in schematic form the circuit diagram of the phase control apparatus.

Referring now to the drawings, and in particular to FIG. 1, the input portion of the circuit is indicated generally by the numeral 10. The phase shift portion of the circuit is indicated generally by the numeral 12. The electrohydraulic system including the vibrator is indicated generally by the numeral 14 and the feedback network is indicated generally by the numeral 16.

Consider first the electrohydraulic system indicated by numeral 14. This includes a reaction type vibrator with a mass 66 inside of which is a cylinder 67 into which is fitted a piston 68 having a piston rod 70 which extends out of the cylinder and is attached to a base plate 72 which rests on the earth 71. Mounted on the base plate is an accelerometer 80 and mounted on the mass 66 is a displacement sensor 78 which is connected by means 79 to the piston. Vibrators, commonly have a second piston rod that is positioned above the piston as represented in this instance by the dashed line 79 that passes through the top of the cylinder 66. The sensor 78 then connects between this piston rod and the cylinder in a manner well known to those skilled in the art. In other words, the sensor 78 will put out a signal which is a function of the displacement of the piston with respect to the mass and the accelerometer 80 will put out a signal which is a function of the acceleration of the base plate 72.

The vibrator is driven by an electrohydraulic valve system indicated by the numeral 50 and which is well known in the art and is available as a commercial product. This electrohydraulic valve system 50 has two output lines 73 and 74 which go respectively to the cylinder on opposite sides of the piston into spaces 75 and 76, respectively, An electrical signal to drive the vibrator comes in on lead 45 to an amplifier 44 and from the amplifier by lead 48 to the input of the electrohydraulic control 50.

There are also two other inputs to the amplifier 44, which come by leads 46 and 47. The lead 47 carries a voltage which is generated in the last stage of the hydraulic control 50 and which is a function of the displacement of the valve in the final stage of the control. This displacement signal of the valve comes by lead 52 to a valve feedback detector 54 to potentiometer 56 to ground 60. Lead 47 taps off a selected fraction of the output of the valve feedback detector as input to the amplifier 44. Similarly, the output of the mass displacement sensor 78 goes by lead 82 to a mass feedback detector 86, the output of which goes by lead 88 to potentiometer 58 and then to ground. Lead 46 taps a portion of this signal and introduces it as an additional input to the amplifier 44.

The purpose of the two feedback inputs from the valve and the mass is to ensure that the hydraulic valve system and the vibrator will operate properly as a vibrating unit in response to a sinusoidal signal coming in on the input line 45.

This vibrator system is of conventional design and is in daily use in the geophysical industry and is so well known that further detailed description is not necessary. Also, certain details of the circuits have not been explained because of the fact that it is a commercial apparatus and is well known.

There is an input section indicated by the numeral 10 which includes a radio receiver 18 and amplifier 20. A reference sweep signal for driving the vibrator is generated locally or at a remote location, generally in the recording truck, and this signal is transmitted by radio to the vibrator truck and represents on the output lead 21 of the amplifier, the reference sweep signal which is to be impressed upon the earth by the base plate.

The dotted line 49 shows a connection between output lead 21 carrying the reference sweep signal and input lead 45 to the vibrator. If this lead 49 is closed, then the reference sweep signal generated locally or received by radio will impress upon the earth a signal which will be more or less generally identical with the reference sweep signal. However, because the impressed signal will differ in phase from that of the reference sweep signal, it is important that some control be provided in order to maintain the seismic signal going into the earth to be identical to that generated or locally received by the radio 18. The reason for the phase difference is that the mechanical-hydraulic system, comprising the valves, fluid and moving system, has its own inertia, compliance and friction that introduce a phase shift between parts of the system. To do this, part of the output signal as measured by the accelerometer is fed back through lead 84 to an accelerometer amplifier 90 and thence to a multiplier 32 by means of lead 31. The other input to the multiplier comes from lead 21 to junction 26, and then by means of lead 30 to the multiplier.

In the multiplier these two signals are multiplied and their product is carried to the potentiometer 38 by lead 34 and then to ground at 36. A potentiometer slider is provided which taps off a portion of the output voltage of the multiplier and by lead 29 carries it as input to a phase shifter 28. The other input to the phase shifter comes from junction 26 by lead 27 and this is the sweep signal that is generated locally or received by the radio. The output of the phase shifter 28 goes to lead 45 as an input to the amplifier 44.

In order to utilize this feedback system of control, the lead shown as dashed line 49 is cut and the input of the electrohydraulic system is connected to the phase shifter 28, the input of which comes from the locally generated or radio received sweep signal and a correction signal which comes from the multiplier 32.

In conventional use the control signal provided to the phase shifter portion identified by numeral 12 comes from the accelerometer 80, amplifier 90 and lead 31. Heretofore, this has been a fairly satisfactory circuit for maintaining identical phase between the base plate output and the input sweep signal. When the accelerometer output is sufficiently large so that its frequency and phase is clearly evident, this type of feedback and control is adequate.

However, I have found that at low frequencies this accelerometer signal becomes very small. Furthermore, it is distorted and contains harmonics, so that even with filtering there is not provided an adequate control signal to the multiplier.

Figure 2:
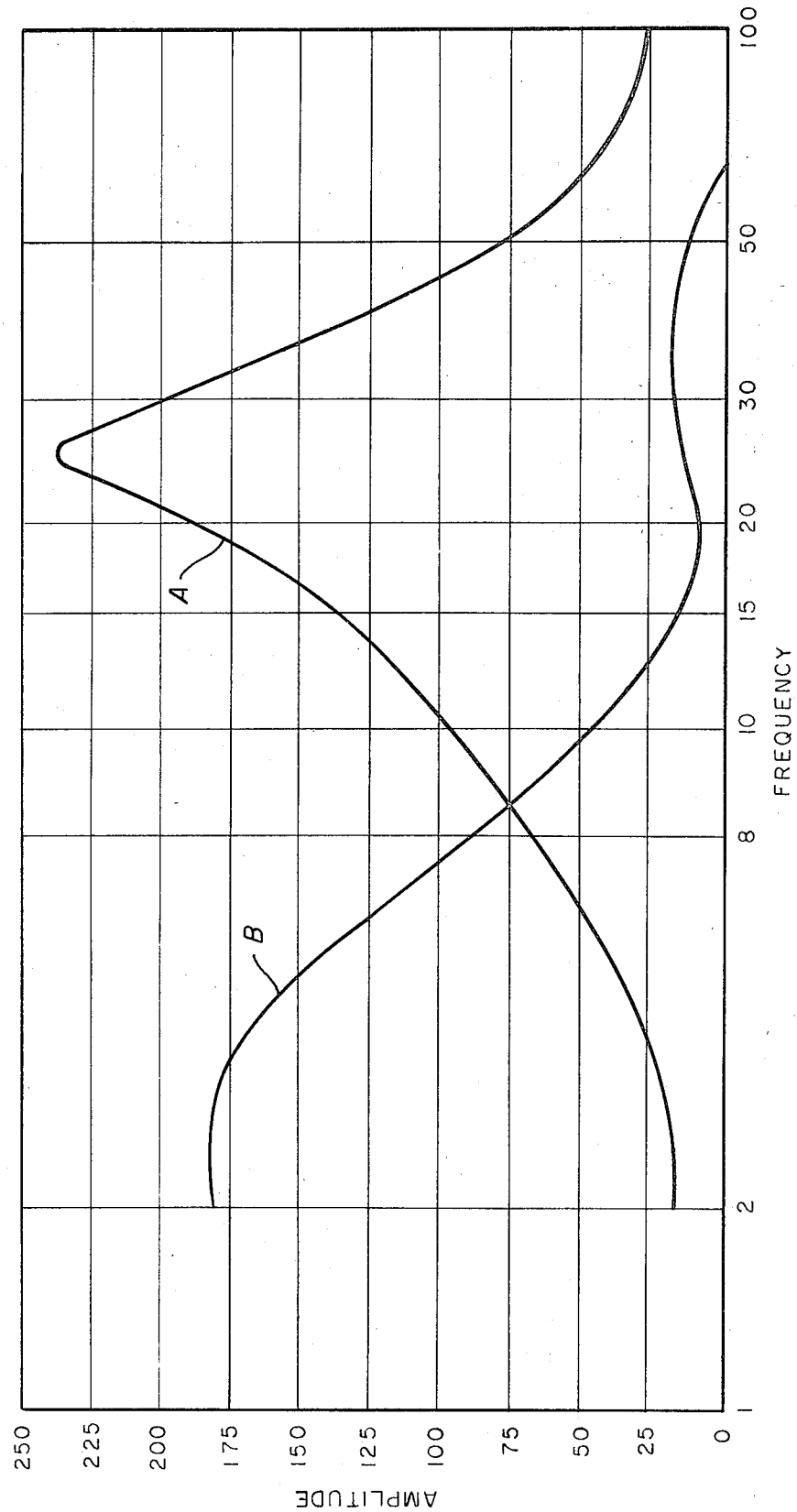
FIG. 2 illustrates curves A and B. Curve A shows the amplitude of the base plate displacement or second integral of the accelerometer signal. Curve B shows the amplitude of the mass displacement signal relative to the base plate displacement signal.

This is shown in FIG. 2, where curve A, represents, as a function of frequency, the base plate displacement or second integral of acceleration relative to the earth and curve B represents the mass displacement relative to the base plate. Curve A is a function of the signal that comes from the accelerometer on the base plate, while curve B is a function of the output of the mass displacement sensor 78. It will be evident on curve A that at some intermediate frequency such as 25 cycles there is a resonance and the amplitude of acceleration of the base plate rises rapidly to a peak. At frequencies above and below this resonance frequency the amplitude of acceleration of the base plate drops rapidly. Going to low frequencies, this drops to a very small output which is difficult to detect and is impure in wave shape containing harmonics and noise.

This resonance is a normal function of the vibrator system itself and of the earth and may vary from position to position on the earth, and between one vibrator and another. The only thing common to all vibrator systems is that there is such a resonance, which may vary in frequency above and below the indicated value of 25 Hz.

Figure 3:
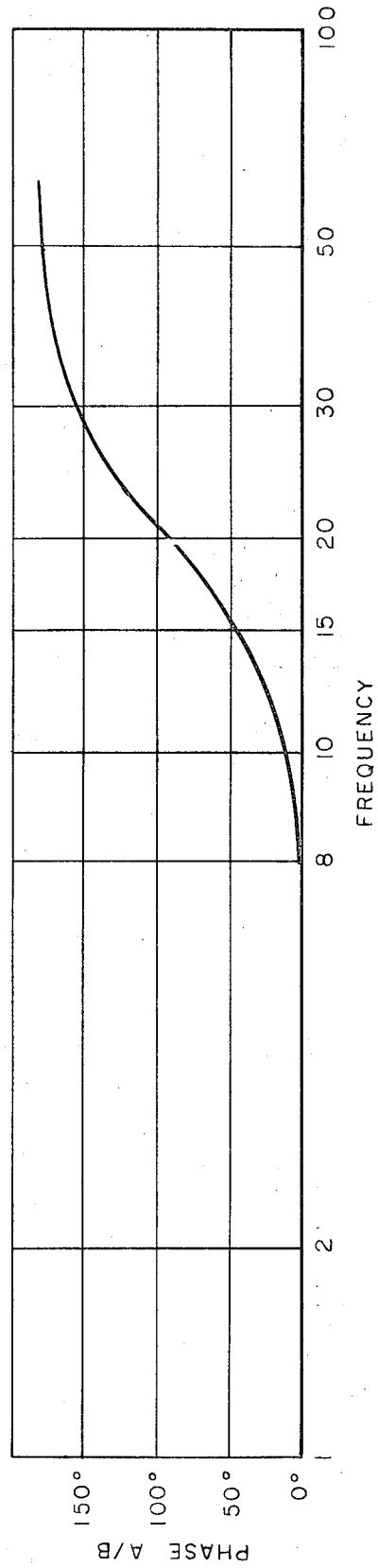
FIG. 3 illustrates a curve showing the relative phase of the signals of curve A to the signals of curve B of FIG. 2.

In FIG. 3 is shown a curve of the phase change of curve A relative to curve B of FIG. 2 as a function of frequency. At frequencies well below the resonance frequency, the phase of the base plate acceleration is zero degrees relative to the mass displacement signal. However, as frequency increases, there is a change of phase by 180° so that at frequencies well above the resonance point there is a phase change of 180°.

However, below such frequencies as perhaps 10 Hz, it will be clear that the phase angle between the mass displacement signal and the base plate accelerometer signal will be zero. Furthermore, as is seen from FIG. 2 the amplitude of the mass displacement signal is larger by a factor of ten or more than the signal from the accelerometer.

Since the two signals are in phase, and the mass displacement signal is larger, therefore in this invention I use as a combined feedback signal the sum of the accelerometer signal and the mass displacement signal. As frequency is increased, the mass displacement signal decreases, while the base plate accelerometer signal increases, so that the sum of the two maintains a sizable value.

Furthermore, in the region where the accelerometer begins to change phase, the mass displacement signal is so small as to be negligible in comparison to the accelerometer signal. Thus, even though they do change relative phase, the contribution to the total signal of the mass displacement signal is small enough to be neglected.

It is therefore possible by combining the signal from the mass displacement sensor and the accelerometer to provide a feedback signal which is of much larger amplitude at low frequencies and cleaner in respect to noise and harmonics, so that a much more accurate phase control can be provided.

Therefore, the improvement in this system comprises joining as input to the accelerometer amplifier 90 a portion of the signal on the mass feedback detector amplifier 86. This is done through adding resistor 94 and a similar adding resistor 92 in lead 84 from the accelerometer. Combining the signals as at junction 96 from the mass feedback detector and the accelerometer in the manner indicated before going to the amplifier 90 and the multiplier 32 a more precise phase control of the vibrator system can be provided.

While I have shown simple adding resistors 92 and 94 to combine these two signals, it is of course well known that various amplitude adjustment controls such as potentiometers, amplifiers, etc., can be provided to afford any desired ratio between the two signals from the displacement sensor and the accelerometer as is well known in the art.

The system illustrated for utilizing both the accelerometer signal and a function of the mass displacement signal as a composite feedback signal to the multiplier means, is only one of many possible ways of accomplishing the desired result. The adding of the two signals is not only the simplest possible system, but in view of the variation in amplitude with frequency of the two signals is a valid method of combination. It will be understood that a system in which the mass displacement signal is used alone at low frequencies and the accelerometer signals is used alone at high frequencies will also work. This can be accomplished by a switching means, well known in the art, such as a relay, optical switch, or manual toggle switch as diagrammatically represented in dotted line embodiment at 91 and 93 in FIG. 1, that switches from one to the other at appropriate times, or in accordance with specific frequencies, or specific phase differences, etc., also it is possible to switch from one signal to the other with an overlap, or addition of the two signals, over a range of time of frequency. A phase detector 95 such as a well known wave form cross-over detector or a multiplier are utilized as a means to determine the phase difference which in turn selectively actuates either switch 91 and/or switch 93. In such case, it may be desirable to taper one signal down and the other up during this overlap period to avoid transient changes that might upset the control system. Thus my invention includes other possible ways (in addition to adding) which might be known to a man skilled in the art to combine a function of each of the two signals to provide a composite feedback signal.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a geophysical earth vibrator system including:
   means to provide a reference sweep signal having low and high frequency portions,
   a hydraulic actuated reaction mass type vibrator,
   a baseplate resting on said earth and hydraulically connected to said mass of said vibrator,
   electrohydraulic servo-valve means to drive said hydraulic actuated vibrator,
   a sensor means on said baseplate to provide a first control signal as a function of the acceleration of said baseplate,
   sensor means to provide a second control signal responsive to a function of the relative displacement of said mass and said baseplate,
   a phase control network including means to generate an error signal proportional to the phase error between a feedback control signal and said reference sweep signal, and
   means to connect said reference sweep signal to said electrohydraulic servo-valve through said phase control network, to form a drive sweep signal to drive the vibrator the phase of said drive sweep signal being controlled by said error signal; the improvement in a method of generating said feedback control signal comprising the steps of:
   a. determining the phase difference between said first and second control signals,
   b. forming said feedback control signal from said second control signal during said low frequency portion when said determined phase difference is substantially zero, and
   c. forming said feedback control signal from said first control signal during said high frequency portion when said determined phase difference is greater than zero.

2. In the system of claim 1 wherein said improved steps are accomplished by adding said first and second control signals.

3. In the system of claim 2 the further improvements wherein said adding is accomplished by adjusting the amplitude of said second control signal with respect to said first control signal such that the phase of said resultant added signal is substantially identical to the phase of said first control signal.

4. In the system of claim 1 wherein said feedback control signal is formed by switching to said second control signal during said low frequency portion when said determined phase difference is substantially zero, and to said first control signal during said high frequency portion when said determined phase difference is greater than zero.

5. In a geophysical earth vibrator system including:
   means to provide a reference sweep signal having low and high frequency portions,
   a hydraulic actuated reaction mass type vibrator,
   a baseplate resting on said earth and hydraulically connected to said mass of said vibrator,
   electrohydraulic servo-valve means to drive said hydraulic actuated vibrator, a sensor means on said baseplate to provide a first control signal as a function of the acceleration of said baseplate;

sensor means to provide a second control signal responsive to a function of the relative displacement of said mass and said baseplate;

a phase control network including means to generate an error signal proportional to the phase error between a feedback control signal and said reference sweep signal, and means to connect said reference sweep signal to said electrohydraulic servo-valve through said phase control network to form a drive sweep signal to drive the vibrator, the phase of said drive sweep signal being controlled by said error signal, the improvement in means to create said feedback control signal comprising:

a junction connected to said first control signal through a first adding resistor and to said second control signal through a second adding resistor.

6. The system of claim 5 wherein said means to create said feedback control signal comprises:

means to determine the phase difference between said first and second control signals and means to switch the source of said feedback control signal to said first control signal when said phase difference between said first and second control signals are greater than zero and/or to switch source of said feedback control signal to said second control signal when the phase between said first and second control signals is substantially zero.

* * * * *